No. 694,559. Patented Mar. 4, 1902.
W. S. LIVENGOOD.
HAY RAKE.
(Application filed July 1, 1901.)
(No Model.)
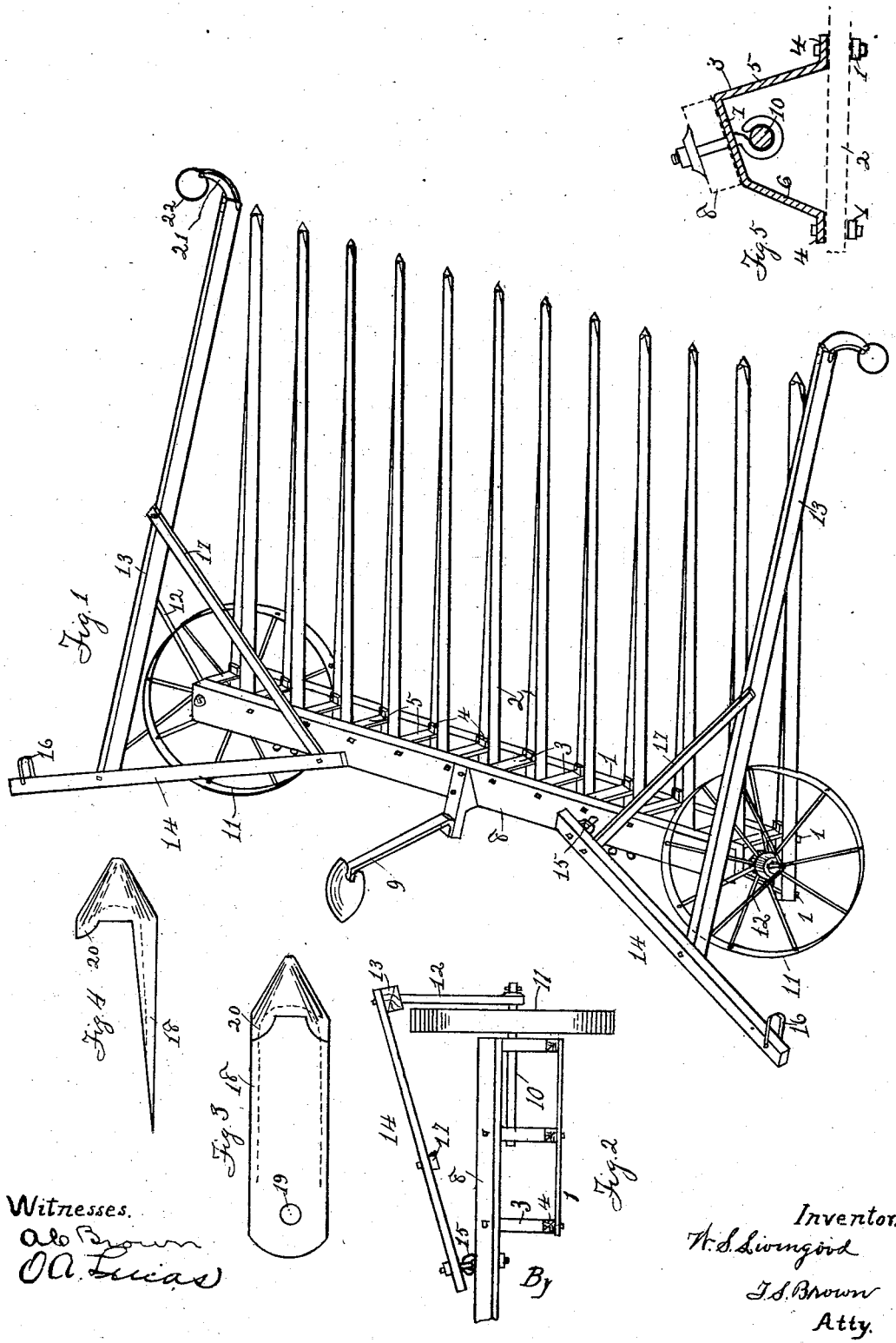
Witnesses.
Alo Brown
OA Lucas
Inventor.
W. S. Livengood
J. S. Brown
Atty.

UNITED STATES PATENT OFFICE.

WINFIELD S. LIVENGOOD, OF KANSAS CITY, MISSOURI, ASSIGNOR TO SMITH & SONS MANUFACTURING COMPANY, OF KANSAS CITY, MISSOURI, A CORPORATION OF MISSOURI.

HAY-RAKE.

SPECIFICATION forming part of Letters Patent No. 694,559, dated March 4, 1902.

Application filed July 1, 1901. Serial No. 66,765. (No model.)

*To all whom it may concern:*

Be it known that I, WINFIELD S. LIVENGOOD, a citizen of the United States, residing at Kansas City, in the county of Jackson, in the State of Missouri, have invented certain new and useful Improvements in Hay-Rakes, of which the following is a full, clear, and exact description, reference being had to the accompanying drawings, which form a part of this specification.

My invention relates to improvements in hay-rakes, having more particular reference to the construction of a trussed rake-frame, whereby is provided a light, durable, and strong frame, to the mounting of the frame upon the carrying-wheels, and to the connection of the draft appliances to the frame and axles of the rake; and my invention consists in certain features of novelty hereinafter described, and pointed out in the claims.

Figure 1 represents an isometric view of a hay-rake embodying my invention and improvements. Fig. 2 represents a rear elevation of one end of the same. Fig. 3 represents a top plan view of an improved cap for the forward ends of the rake-teeth. Fig. 4 represents a side elevation of the same. Fig. 5 represents a detail view of one of the trusses by which the trussed frame is formed.

Similar numerals refer to similar parts throughout the several views.

1 represents stringers extending the width of the rake and upon which the rear ends of the teeth 2 are mounted. Upon said teeth at their rear ends are mounted the brackets 3, which are formed with feet 4, by which they are secured upon the teeth, front and rear supporting members 5 and 6, and a cap 7, connecting said supporting members and upon which the cap-plate 8 is mounted. Said brackets are mounted in such relation that the feet 4 stand directly over the stringers 1, thereby forming a very strong, light, and durable frame and not liable to sag in the middle under the weight of the driver upon the seat 9, mounted upon the cap-plate.

Short axles 10 are secured in the end brackets, and upon said axles are mounted the carrying-wheels 11. Said axles extend beyond the hubs of said wheels, and upon the outer ends thereof are mounted brackets 12, upon which are carried the draft-poles 13. Said draft-poles extend a short distance rearwardly of the frame, and thereupon at their ends are secured draft-bars 14 intermediate their ends, said draft-bars being flexibly secured at their inner ends by connecting-links 15 to the cap-plate 8 and are provided at their outer ends with clevises 16 for the attachment of a whiffletree. (Not shown.) Brace-bars 17 are secured at one end to said draft-bars near their inner ends and at the other end to said draft-poles in advance of the supporting-brackets, thereby giving rigidity to the draft-poles against lateral strains, and 21 represents neck-yokes provided with rings 22 for the attachment of the breast-strap upon the harness of the draft-animal. With this construction by mounting the draft poles upon brackets mounted upon the axles, as herein shown and described, an arrangement of the parts is effected whereby it is made possible to move the rake backward and draw the teeth from under the hay gathered thereon without elevating the point of the teeth from the ground, which at certain times and under certain circumstances it is very desirable to do, and the axles being mounted upon the rake-frame above the horizontal plane of the teeth in the advance movements of the rake the draft constantly tends to draw the points of the teeth close to the ground in proper position to take up the hay.

In Figs. 3 and 4 is shown an improved cap for covering and protecting the points or forward ends of the rake-teeth, in which 18 represents the rim of the cap. Said rim extends longitudinally along the under side of the rake-tooth and is provided with a hole 19 to receive a screw or the like by which the same is secured upon the tooth. Upon the crown of the cap are provided wings or flanges 20, arranged to fit over the upper corners of the tooth. With this construction of the cap it is not necessary that the forward end of the tooth be cut down and dressed to fit the recess or cavity in the crown of the cap, but the cap is simply forced on the end of the tooth, the wings or flanges 20 overlapping and protecting the corners from checking and splitting off, and thus preserving and increasing the life of the tooth and of the rake. It is very light and effective in its use and operation and the crown does not need to be made as large and heavy as if a recess were provided therein to receive the end of a tooth cut and shaped to enter the same.

Having thus fully described my improvements, what I claim as invention, and desire to secure by Letters Patent, is—

1. In a hay-rake of the character described, the combination with the rake-frame, of axles mounted in said frame, carrying-wheels mounted upon said axles, brackets mounted upon said axles beyond the wheel-hubs, draft-poles mounted upon said brackets and extending a distance to the rear of the frame, draft-bars flexibly connected at their inner ends with the frame at a distance from the ends thereof and secured intermediate their ends to the rear ends of said draft-poles, and brace-bars secured to said draft-bars near their inner ends and to said draft-poles in advance of said supporting-brackets; substantially as set forth.

2. In a hay-rake of the character described, the combination with the rake frame and teeth, of axles mounted in said frame, carrying-wheels mounted upon said axles, brackets mounted upon said axles, draft-poles mounted upon said brackets, draft-bars flexibly connected with said rake-frame and secured to said draft-poles, and brace-bars connected with said draft-bars and with said draft-poles, substantially as and for the purpose set forth.

3. In a hay-rake of the character described, the combination with the rake frame and teeth, of axles mounted in said frame above the horizontal plane of the rake-teeth, carrying-wheels mounted upon said axles, brackets mounted thereon, draft-poles mounted upon said brackets, draft-bars having their inner ends flexibly secured to said frame and connected intermediate their ends with the rear ends of said draft-poles, and brace-bars secured to said draft-bars near their inner ends and to said draft-poles in advance of said brackets, and neck-yokes on said draft-poles; substantially as set forth.

4. In a hay-rake of the character described, a frame formed by the combination of stringers extending the length of the rake, rake-teeth mounted at their rear ends upon said stringers, brackets consisting of feet 4, supporting members 5 and 6 and a cap 7 connecting said supporting members, and having their feet mounted upon said teeth directly over said stringers, and a cap-plate mounted upon said brackets; substantially as set forth.

5. In a hay-rake of the character described, the combination of the stringers extending the width of the rake, rake-teeth mounted at their rear ends upon said stringers, brackets mounted upon said teeth at the rear ends thereof, a cap-plate mounted upon said brackets, short axles mounted in the end brackets, and the carrying-wheels and draft appliances mounted upon said axles; substantially as set forth.

WINFIELD S. LIVENGOOD.

Witnesses:
WM. J. SMITH,
O. A. LUCAS.